United States Patent
Haas

(10) Patent No.: US 6,650,971 B2
(45) Date of Patent: Nov. 18, 2003

(54) METHOD FOR ESTABLISHING THE ANGULAR POSITION OF A VEHICLE

(75) Inventor: Hardy Haas, Ditzingen-Schoeckingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/113,439

(22) Filed: Mar. 28, 2002

(65) Prior Publication Data

US 2002/0163437 A1 Nov. 7, 2002

(51) Int. Cl.$^7$ .............................................. G08B 21/00
(52) U.S. Cl. ..................... 701/1; 340/671; 340/425.5
(58) Field of Search ............................. 701/1, 45, 37, 701/70; 340/671, 425.5, 436; 702/151

(56) References Cited

U.S. PATENT DOCUMENTS 6,496,759 B1 * 12/2002 Mattes et al. .................. 701/1
2002/0183962 A1 * 12/2002 Glaser et al. ............... 702/151

* cited by examiner

Primary Examiner—Marthe Y. Marc-Coleman
(74) Attorney, Agent, or Firm—Kenyon & Kenyon

(57) ABSTRACT

A method for establishing the angular position of the vehicle with the aid of at least one roll or rotation rate sensor, and which is checked in the course of a plausibility inspection, to check whether the integrated rotation rate signal is able to reproduce the actual angular position of the vehicle at all or whether it lies outside the angular range which may be considered for the actual angular position of the vehicle on the basis of the driving situation. In particular, the method for establishing the angular position of the vehicle relative to at least one rotational axis, particularly its longitudinal axis and/or its transverse axis, in which the rotation rate of the vehicle about the rotational axis is detected using at least one rotation rate sensor and the angular position, particularly the roll angle about the longitudinal axis of the vehicle and/or the pitch angle about the transverse axis of the vehicle, is established by integration of the detected rotation rate, with the offset error of the rotation rate sensor being taken into consideration, in addition to the rotation rate, the transverse acceleration (that is, the acceleration of the vehicle transverse to the rotational axis) is detected, and is then checked, with reference to the dependence of the actual angular position of the vehicle on the transverse acceleration AQ, to determine whether the established angular position may correspond to the actual angular position of the vehicle.

12 Claims, 1 Drawing Sheet

METHOD FOR ESTABLISHING THE ANGULAR POSITION OF A VEHICLE

FIELD OF THE INVENTION

The present invention relates to a method for establishing the angular position of a vehicle relative to at least one rotational axis, for example, its longitudinal axis and/or its transverse axis, in which the rotation rate of the vehicle about the rotational axis is detected using at least one rotation rate sensor and the angular position, for example, the roll angle about the longitudinal axis of the vehicle and/or the pitch angle about the transverse axis of the vehicle, is established by integration of the detected rotation rate, with the offset error of the rotation rate sensor being considered.

BACKGROUND INFORMATION

Rotation rate sensors used as roll rate sensors may be used in connection with airbag control devices for triggering side and head airbags. A corresponding sensor system may also be used for a rollover prevention system.

The output signal of a rotation rate sensor may be affected by an offset error, which may be conditioned by various factors, such as, for example, aging or incorrect adjustment of the sensor. For simple integration algorithms, with which the angular position of the vehicle may be established, the offset error may lead to drift of the integrated rotation rate signal. Therefore, even during long periods of driving straight on level roads, a calculated roll angle may increase to values that may cause incorrect triggering of restraint devices.

SUMMARY OF THE INVENTION

It is an object of an exemplary embodiment of the present invention to check the angular position of the vehicle, which is established with the aid of at least one rotation rate sensor, in the course of a plausibility inspection, that is, to check whether an integrated rotation rate signal may reproduce the actual angular position of the vehicle or whether it lies outside an angular range that may be considered for the actual angular position of the vehicle, on the basis of a driving situation.

This object may be achieved by an exemplary embodiment according to the present invention in that, in addition to the rotation rate, transverse acceleration AQ, that is, the acceleration of the vehicle transverse to the rotational axis, may be detected and checked, with reference to the dependence of the actual angular position of the vehicle on transverse acceleration AQ, to determine whether the established angular position corresponds to the actual angular position of the vehicle.

The actual angular position of the vehicle may be dependent on corresponding transverse acceleration AQ and the load state of the vehicle. Since the relationship between transverse acceleration AQ and angular position is not definite, the detection of transverse acceleration AQ may not be sufficient to establish the actual angular position of the vehicle. However, each measured transverse acceleration AQ may be assigned an angular range for the actual angular position of the vehicle that covers all possible load states of the vehicle. The angular range that may be considered for the actual angular position of the vehicle on the basis of transverse acceleration AQ measured in parallel represents an easily established and extremely practical framework for the plausibility check of the angular position that may be established by integration of the rotation rate signal detected and in consideration of the sensor offset. With the aid of such a plausibility check, according to an exemplary embodiment of the present invention, whether the rotation rate integral drifts both during straight driving and during driving around curves may be established.

In the exemplary embodiment according to the present invention, which is believed to be advantageous because it may be relatively "simple" to implement, an upper limit value and a lower limit value for the actual angular position are established with reference to the dependence of the actual angular position of the vehicle on transverse acceleration AQ. It is then checked whether the established angular position lies within the interval established by the upper and lower limit values. The angular position that results at a given transverse acceleration AQ at the maximum load state of the vehicle may be selected as the upper and/or lower interval limit, since, in this case, the greatest angles of inclination may be expected. However, the interval limits may be selected more generously, in consideration of possible changes in the offset error.

The relationship between the actual angular position of a vehicle and the corresponding transverse acceleration depends on the respective vehicle type. Sometimes, it may be described well by a linear relationship, so that the interval limits may be established simply by multiplying current detected transverse acceleration AQ by the same factor. If the relationship between the actual angular position and transverse acceleration AQ may not be readily functionally described, corresponding data should be established and made available in the form of characteristic curves by a manufacturer, for example, in the course of driving tests. The limit values for the actual angular position of the vehicle may then be established easily, with the aid of a characteristic curve that reproduces the relationship between the actual angular position and transverse acceleration AQ, during normal driving operation of the fully loaded vehicle.

In an exemplary method according to the present invention, not only is a plausibility check of the established angular position performed using detected transverse acceleration AQ, but also a possibly necessary correction of the established angular position. Thus, it is believed to be advantageous to correct the established angular position, if it exceeds the upper limit value for the actual angular position or falls below the lower limit value for the actual angular position, at a given transverse acceleration AQ. The limit value that the angular position exceeds or falls below, respectively, may be used for correction, for the established angular position.

In another exemplary method according to the present invention, in addition to the plausibility check of the established angular position, a correction of the offset error also occurs if necessary, with transverse acceleration AQ being used as a basis. Thus, correction of the offset error may be necessary, if the established angular position of the vehicle exceeds the upper limit value for the actual angular position or falls below the lower limit value for the actual angular position, at a given transverse acceleration AQ. It is believed to be advantageous if this quasi self-learning correction of the offset error only occurs slowly. For this purpose, the offset error is decremented and/or incremented by a presettable value. The respective currently established offset error is stored so that the current offset error may be taken into consideration, during the establishment of the angular position of the vehicle, with reference to the detected rotation rate and, for example, may also be available when driving is resumed.

Yet another exemplary method according to the present invention may perform a correction of the established angular position independently of a possible correction of the offset error, and the criteria for these two corrections do not have to be identical.

DETAILED DESCRIPTION

Figure 1:
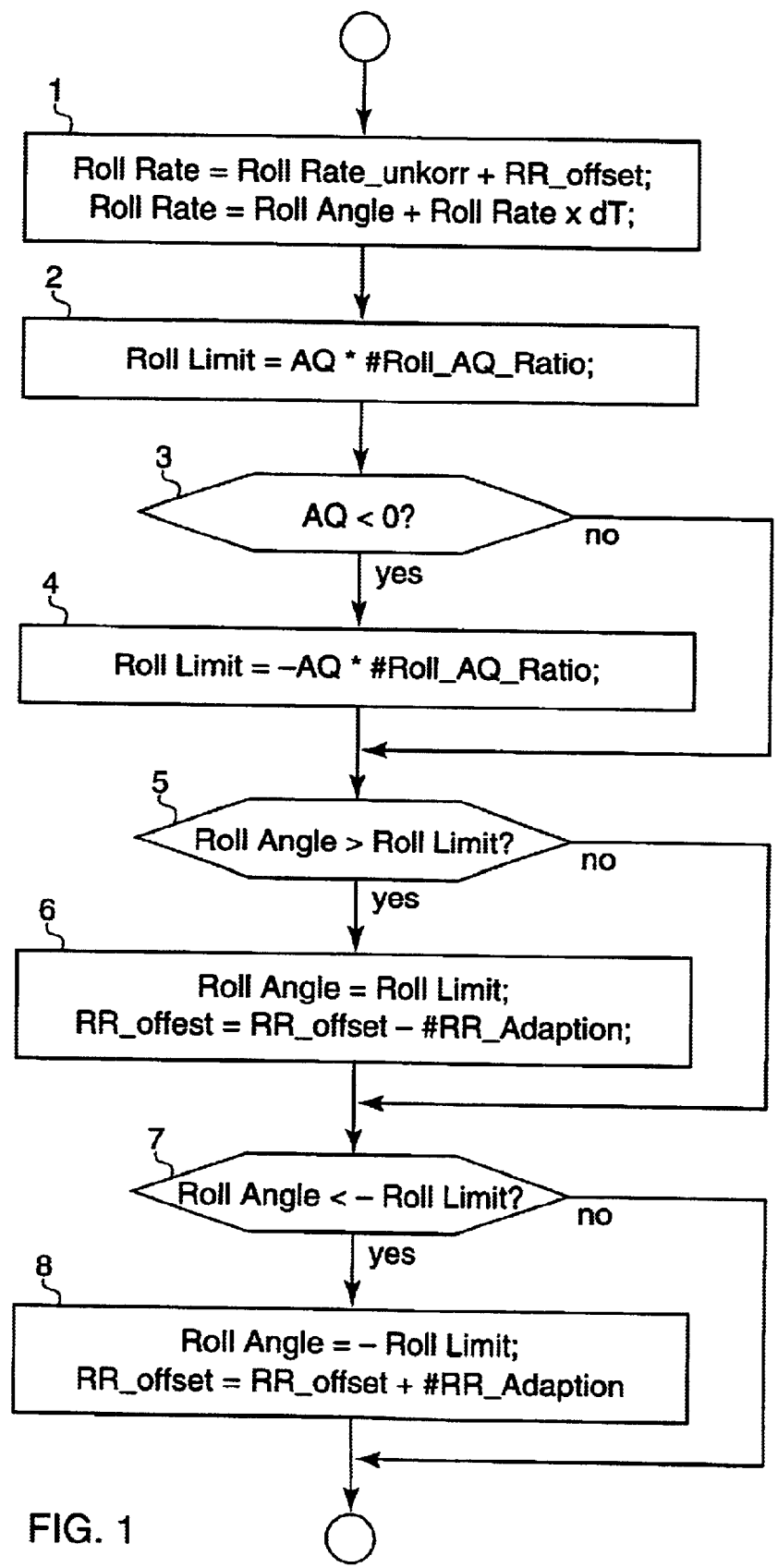
FIG. 1 is a block diagram of an exemplary method according to the present invention for establishing the angular position of a vehicle with reference to, for example, a roll rate sensor.

The rotation rate of the vehicle about its longitudinal axis is detected as sensor signal roll rate_uncorr, with the aid of the roll rate sensor. As described above, sensor signal roll rate_uncorr is affected by an offset error RR_offset, which may be conditioned by aging or incorrect adjustment of the rotation rate sensor.

In block 1 of FIG. 1, sensor signal roll rate_uncorr is first corrected by adding offset error RR_offset.

$$\text{Roll rate} = \text{roll rate\_uncorr} + RR\_\text{offset} \tag{1a}$$

The roll rate signal resulting from this, which is corrected for offset, is then used as the basis of an integration for establishing the roll angle.

$$\text{Roll Angle} = \text{roll angle} + \text{roll rate} * dT \tag{1b}$$

The plausibility check of the roll angle established this way begins in block 2. The upper limit value for the actual roll angle is established as roll limit with reference to transverse acceleration AQ detected in parallel to the roll rate, $$\text{Roll Limit} = AQ * \#\text{roll}\_AQ\_\text{Ratio} \tag{2}$$

with #roll_AQ_Ratio being a parameter, for example, 5°/1 g, or a characteristic curve for the relationship between the actual roll angle and transverse acceleration AQ.

In block 3 of FIG. 1, it is checked whether transverse acceleration AQ is negative, $$AQ < 0 \tag{3}$$

to establish, in block 4, the lower roll limit as the authoritative roll limit symmetrically to the upper roll limit established in block 2. Therefore, in this exemplary embodiment, $$\text{Roll Limit} = -AQ * \#\text{roll}\_AQ\_\text{Ratio} \tag{4}$$

In blocks 5 and 7 it is checked whether the established roll angle lies within the interval for the actual roll angle established by the roll limits and may therefore correspond to the actual roll angle of the vehicle.

$$\text{Roll Angle} > \text{Roll Limit?} \tag{5}$$

and/or $$\text{Roll Angle} < -\text{Roll Limit?} \tag{7}$$

If the established roll angle lies outside this interval and therefore may not correspond to the actual roll angle of the vehicle, both a correction of the established roll angle and a correction of the stored offset error may be performed.

If the established roll angle is greater than the upper roll limit, in block 6, the upper roll limit is accepted as the new roll angle.

$$\text{Roll Angle} = \text{Roll Limit} \tag{6a}$$

In addition, the offset error is adjusted by subtraction of a correction value #RR_Adaption for very slow learning of the roll rate offset.

$$RR\_\text{offset} = RR\_\text{offset} - \#RR\_\text{Adaption} \tag{6b}$$

Analogously to block 6, in block 8, the lower roll limit is accepted as the new roll angle, if the established roll angle is less than the lower roll limit.

$$\text{Roll Angle} = -\text{Roll Limit} \tag{8a}$$

In addition, the offset error is adjusted by adding the correction value #RR_Adaption for very slow learning of the roll rate offset.

$$RR\_\text{offset} = RR\_\text{offset} + \#RR\_\text{Adaption} \tag{8b}$$

What is claimed is:

1. A method for establishing the angular position of a vehicle relative to at least one rotation axis, the method comprising:

detecting a rotation rate of the vehicle about the at least one rotational axis using at least one rotation rate sensor;

establishing the angular position by integrating the rotation rate, an offset error of the at least one rotation rate sensor being considered;

detecting a transverse acceleration, the transverse acceleration being an acceleration of the vehicle transverse to the rotational axis; and checking whether the angular position may correspond to an actual angular position of the vehicle, with reference to a dependence of the actual angular position on the transverse acceleration.

2. The method of claim 1, further comprising:

establishing an upper limit value and a lower limit value for the actual angular position, with reference to the dependence of the actual angular position on the transverse acceleration; and checking whether the established angular position lies within an interval established by the upper limit value and the lower limit value.

3. The method of claim 2, wherein the upper limit value and the lower limit value are established using a characteristic curve that reproduces a relationship between the actual angular position and the transverse acceleration, during a normal driving operation of a fully loaded vehicle.

4. The method of claim 2, wherein the established angular position is corrected if it exceeds the upper limit value or falls below the lower limit value.

5. The method of claim 4, wherein the upper limit value is accepted for the established angular position if the established angular position exceeds the upper limit value, and the lower limit value is accepted for the established angular position if the established angular position falls below the lower limit value.

6. The method of claim 2, wherein the offset error is corrected if the angular position one of exceeds the upper limit value and falls below the lower limit value.

7. The method of claim 1, wherein a basis of a possibly necessary correction of the established angular position includes the transverse acceleration.

8. The method of claim 1, wherein a basis of a correction of the offset error includes the transverse acceleration.

9. The method of claim 8, wherein the offset error is corrected by at least one of decrementing and incrementing the offset error by a presettable value.

10. The method of claim 8, wherein a respective currently established offset error is stored so that a current offset error may be considered during the establishing of the angular position of the vehicle, with reference to the detected rotation rate, and is available when driving is resumed.

11. The method of claim 1, wherein the at least one rotational axis includes at least one of a longitudinal axis and a transverse axis.

12. The method of claim 1, wherein the angular position includes at least one of a roll angle about a longitudinal axis of the vehicle and a pitch angle about a transverse axis of the vehicle.

* * * * *